United States Patent [19]

Furuichi et al.

[11] Patent Number: 4,746,145
[45] Date of Patent: May 24, 1988

[54] CHASSIS FRAME FOR RIDER-CONTROLLED WORKING VEHICLE

[75] Inventors: Noriyasu Furuichi; Masahiro Yamamoto; Yuji Kishizawa; Kenji Nakamura, all of Saitama, Japan

[73] Assignee: Honda Giken Kogyo Kabushiki Kaisha, Tokyo, Japan

[21] Appl. No.: 829,767

[22] Filed: Feb. 14, 1986

[30] Foreign Application Priority Data

| Feb. 14, 1985 | [JP] | Japan | 60-26995 |
| Feb. 14, 1985 | [JP] | Japan | 60-18301 [U] |
| Feb. 14, 1985 | [JP] | Japan | 60-19583 [U] |
| Feb. 14, 1985 | [JP] | Japan | 60-19664 [U] |

[51] Int. Cl.$^4$ .......................................... B62D 21/04
[52] U.S. Cl. .................................. 280/786; 180/53.7; 180/73.2; 180/312; 280/797; 280/800
[58] Field of Search ............... 280/781, 786, 797, 800; 180/53.3, 53.7, 312, 73.2

[56] References Cited

U.S. PATENT DOCUMENTS

| 1,560,351 | 11/1925 | Seidel | 280/786 |
| 1,991,619 | 2/1935 | MacKenzie | 280/786 |
| 2,806,542 | 6/1957 | Scherenberg et al. | 180/73.2 |
| 4,161,991 | 7/1979 | van der Lely | 180/53.7 |
| 4,203,499 | 5/1980 | Miyata | 180/312 |

FOREIGN PATENT DOCUMENTS

| 671777 | 12/1929 | France | 180/53.7 |
| 54-93936 | 7/1979 | Japan. | |
| 60-13872 | 1/1985 | Japan. | |
| 501107 | 2/1939 | United Kingdom | 280/786 |

Primary Examiner—Kenneth R. Rice
Attorney, Agent, or Firm—Irving M. Weiner; Joseph P. Carrier; Pamela S. Burt

[57] ABSTRACT

A chassis frame in a rider-controlled working vehicle comprises a front frame member having a substantially channel-shaped cross section opening downwardly, a central frame in the form of a tubular body having a substantially rectangular cross section, and a rear frame member having a substantially channel-shaped cross section opening upwardly, the front, central, and rear frame members having confronting ends joined in interfitting relation. A front wheel differential is housed in the front frame member, and an engine is supported on the front frame member by rubber mounts. A power output shaft operatively coupled to the engine is disposed in the front frame member and has a front end positioned within a front end of the front frame member so as not to project forwardly therefrom. A cover plate is detachably attached to the front frame member below the power output shaft.

9 Claims, 4 Drawing Sheets

CHASSIS FRAME FOR RIDER-CONTROLLED WORKING VEHICLE

BACKGROUND OF THE INVENTION

1. Field of the Invention

The present invention relates to a ridercontrolled working vehicle such as a tractor for use in various fields such as agriculture, civil construction, and transportation, for example, and more particularly to a chassis frame for such a working vehicle.

This application is copending with related and commonly assigned U.S. patent applications U.S. Ser. No. 764,433 and U.S. Ser. No. 764,434, both filed Aug. 9, 1985. Note, however, that each of such applications is directed to novel subject matter which is patentably distinct from the novel subject matter of the present application.

2. Description of Relevant Art

Various conventional rider-controlled working vehicles are known. The known rider-controlled working vehicles have a chassis frame including an intermediate member such as a power transmission case with its front and rear surfaces coupled respectively to the rear surface of the casing of an engine unit located in a front portion of the vehicle and the front surface of a gear transmission case disposed in a rear portion of the vehicle. Such known, conventional vehicles are disclosed in Japanese Laid-Open Utility Model Publication Nos. 55-138124 published on Mar. 26, 1979, 57-143923 published on Sept. 9, 1982, 57-199131 published on Dec. 17, 1982, and 58-100130 published on July 7, 1983, for example. Where a differential is connected to front wheel axles of the known vehicles, it is disposed below a front frame member. Where a working vehicle has a power output shaft for a working unit to be coupled to the front end of the vehicle body, the power output shaft projects from the front frame member as disclosed in Japanese Laid-Open Publication No. 57-199131 or is exposed below the front frame member as disclosed in Japanese Laid-Open Publication Nos. 57-143923 and 58-100130.

There are many disadvantages associated with the chassis design as of the known rider-controlled working vehicles, some of which are as follows. The conventional chassis frame comprises a number of frame members joined together. If these frame members were to be coupled in planes perpendicular to the longitudinal axis of the vehicle, it would be difficult to maintain a uniform degree of mechanical strength of the chassis frame since the coupled areas would be subject to bending and twisting stresses imposed during movement of the vehicle. It would also be difficult to achieve a desired dimensional accuracy because many bolt holes would have to be formed and many bolts would have to be tightened, resulting in an increased number of assembling steps. In designs where the engine unit casing is part of the chassis frame, the engine vibration will be applied directly to the vehicle body. The working vehicle with the differential mechanism situated below the chassis frame has a reduced minimum height from ground and hence is not suitable for travel over rough terrain. If the height of the chassis frame were increased to eliminate such a drawback, then the height of the vehicle or the engine hood would also be increased, resulting in difficulty in handling and maneuvering the vehicle. Where the power output shaft is located on the front end of the vehicle and projects forwardly from the chassis frame or is exposed below the chassis frame, foreign objects tend to interfere with the power output shaft when it is not in use.

The present invention has been made in an effort to eliminate the aforesaid disadvantages of the conventional rider-controlled working vehicles.

SUMMARY OF THE INVENTION

It is an object of the present invention to provide a chassis frame for a rider-controlled working vehicle which has a uniform degree of mechanical strength, can be assembled in a reduced number of steps and hence easily, and has a desired degree of dimensional accuracy that can easily be achieved.

Another object of the present invention is to provide a chassis frame which has a sufficient minimum height from ground for a reduced vehicle height and is best suited for use in a rider-controlled working vehicle.

Still another object of the present invention is to provide a chassis frame for a rider-controlled working vehicle which s of such a construction as to reduce engine vibration transmitted to the vehicle body.

A still further object of the present invention is to provide a chassis frame for a rider-controlled working vehicle having a power output shaft for connection to a working unit to be coupled to the working vehicle, wherein the power output shaft is disposed out of physical interference with foreign objects.

According to the present invention, a chassis frame in a rider-controlled working vehicle having an engine, a gear transmission, and a differential, includes a front frame member having a substantially channel-shaped cross section opening downwardly, the engine being mounted on the front frame member, a rear frame member having a substantially channel-shaped cross section opening upwardly, the gear transmission being connected to a rear end of the rear frame member, and a central frame in the form of a tubular body having a substantially rectangular cross section and positioned between the front and rear frame members. The front, rear, and central frame members having confronting ends joined in interfitting relation. The differential is housed in the front frame member. The engine is mounted on the front frame member by rubber mounts. A power output shaft is disposed in the front frame member and has a front end disposed within a front end of the front frame member, the power output shaft being operatively coupled to the engine. A cover plate is attached to the front frame member below the power output shaft.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

Figure 1:
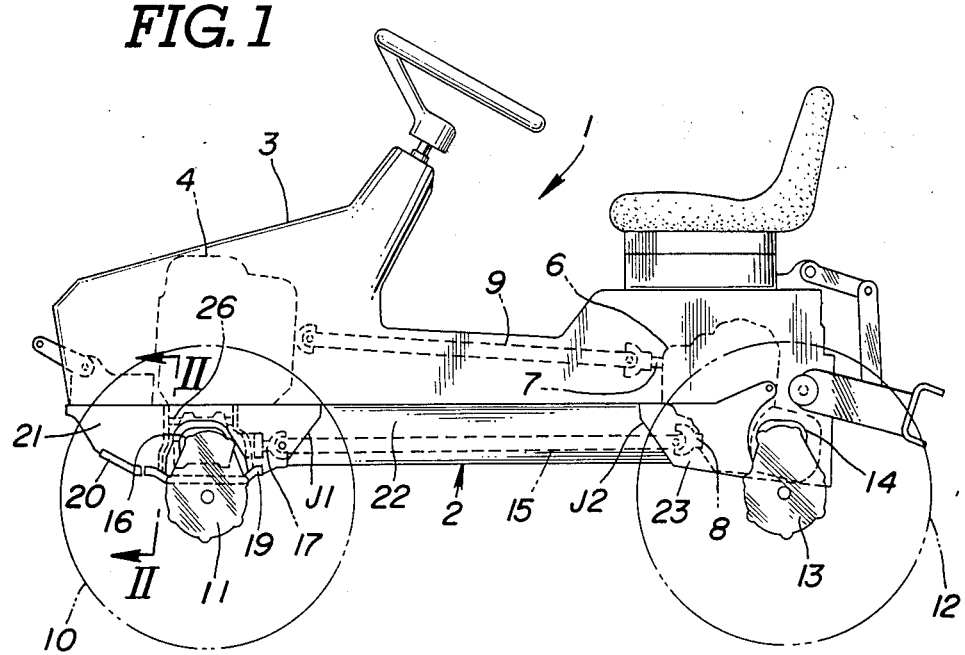
FIG. 1 is a side elevational view of a four-wheel drive, rider-controlled working vehicle having a chassis frame according to the present invention.
Figure 2:
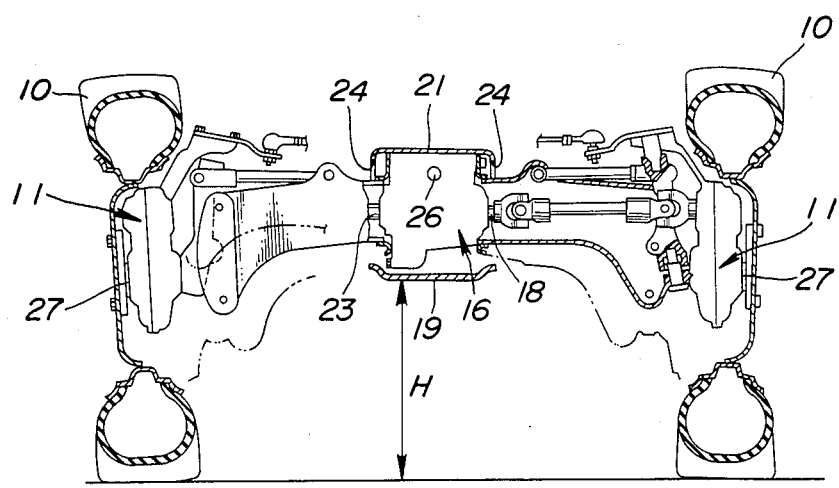
FIG. 2 is an enlarged cross-sectional view taken along line II—II of FIG. 1.

As shown in FIG. 1, a rider-controlled working vehicle 1 has a main chassis frame 2 extending longitudinally through the vehicle body along its central axis. The main frame 2 generally comprises a front frame member 21, a central frame member 22, and a rear frame member 23. An engine 4 covered with an engine hood 3 is mounted on the front frame member 21. A gear transmission 6 is coupled to the rear end of the rear frame member 23. The engine 4 has a crankshaft 5 (see FIG. 7) coupled to the input shaft 7 of the gear transmission 6 by a propeller shaft 9. The working vehicle 1 also includes a pair of front wheels 10 disposed on opposite sides of the front frame member 21, and a pair of rear wheels 12 disposed on opposite sides of the gear transmission 6. A rear wheel differential 14 is integrally incorporated in the rear end of the gear transmission 6, and is operatively coupled to final speed reducers 13 associated with the rear wheels 12, respectively. The gear transmission 6 has an outer shaft 8 connected to the input shaft 17 of a front wheel differential 16 through a propeller shaft 15 extending through the main frame 2. As shown in FIG. 2, the front wheel differential 16 has output shafts 18 operatively coupled to final speed reducers 11 associated respectively with the front wheels 10. Power from the speed reducers 11 is transmitted by front axles 27 to the front wheels 10, respectively.

Figure 3:
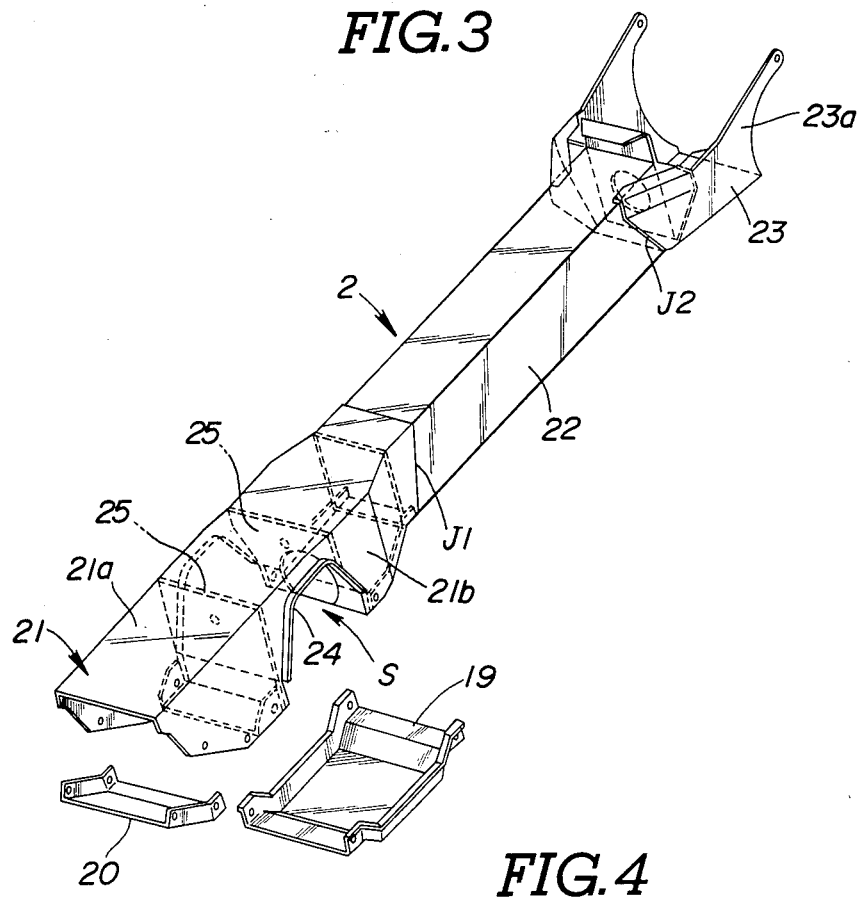
FIG. 3 is a perspective view, partly exploded, of the chassis frame of the invention.

As clearly shown in FIG. 3, the central frame member 22 is in the form of a tubular body having a square cross section. The front frame member 21 is of a substantially channel-shaped cross section opening downwardly and includes an upper wall 21a having a larger width than that of the central frame 22 to provide a wide support base for the engine 4. The front frame member 21 also includes a pair of laterally spaced side walls 21b each having a recess 24 opening downwardly for passage therethrough of one of the output shafts 18 of the front wheel differential 16. The rear frame member 23 is of a substantially channel-shaped cross section opening upwardly and includes a bifurcated rear portion 23a in which the lower portion of the gear transmission 6 is fixedly disposed. The front and rear frame members 21, 23 have respective rear and front ends fitted over the front and rear ends, respectively, of the central frame member 22, and is integrally joined thereto at edges J1, J2, respectively, as by welding or riveting. Since the front, central, and rear frame members 21, 22, 23 are integrally joined end to end by the joined fitting edges J1, J2, the overall main frame 2 is more uniform in mechanical strength than conventional chassis frames, wherein front, central, and rear frame members are joined in planes normal to the longitudinal axis of the vehicle, because the joined fitting edges J1, J2 are more resistant to bending and twisting stresses than are the conventional chassis frame designs. Additionally, in comparison to the conventional chassis frame designs the present main frame 2 is more easily assembled since the frame members 21, 22, 23 can be joined together in a reduced number of steps, has an increased degree of dimensional accuracy, and can be manufactured at a lower cost.

Figure 4:
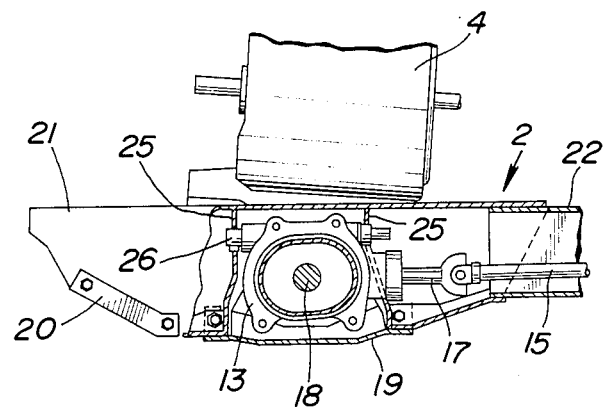
FIG. 4 is a fragmentary vertical cross-sectional view of a support structure by which a front wheel differential is mounted on a front frame member.

A pair of partitions 25 are disposed in the front frame member 21 in longitudinally spaced relation to each other, defining therebetween an installation space S for the front wheel differential 16 between the recesses 24. As shown in FIG. 4, the front wheel differential 16 is swingably suspended by a pin 26 extending through the partitions 25. The recesses 24 of the front frame member 21 have a depth large enough to allow the output shafts 18 of the front wheel differential 16 to move vertically therein as the front wheel differential 16 swings. The front wheel differential 16 located in the space S in the front frame member 21 has a bottom covered with a cover plate 19 detachably attached to the front frame member 21. Inasmuch as the front wheel differential 16 is housed in the channel-shaped front frame member 21, the main frame 1 has a desired minimum height H (FIG. 2) from the ground. As the position of the main frame 1 is not required to be increased to provide such a desired minimum height H, the position of the engine 4, and hence the engine hood 3, remains low.

The cover plate 19 is attached to the front frame member 21 beneath the relatively large, downwardly opening recesses 24 in the side walls 21b for the accommodation of the differential output shafts 18. The cover plate 19 thus attached serves as a reinforcement member for the channel-shaped front frame member 21, which therefore has a desired degree of mechanical strength. The front wheel differential 16 is protected by the cover plate 19 against damage which would otherwise be caused by engagement with foreign objects. Since the cover plate 19 is detachable, the front wheel differential 16 can quickly and easily be installed and subsequently serviced.

Figure 5:
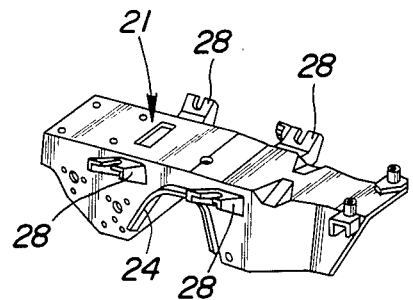
FIG. 5 is a perspective view of the front frame member having engine mounting brackets.
Figure 6:
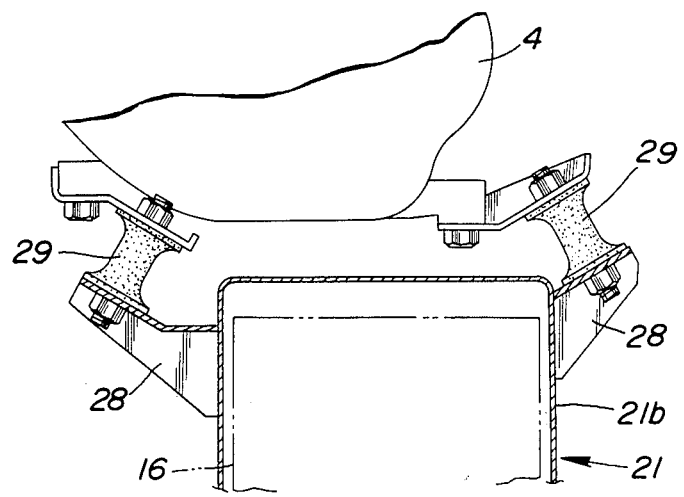
FIG. 6 is an enlarged fragmentary cross-sectional view showing the front frame member on which the engine is mounted.

FIGS. 5 and 6 show a specific arrangement by which the engine 4 is mounted on the front frame member 21. Four spaced engine mounting brackets 28 are welded to upper portions of the side walls 21b of the front frame member 21 (FIG. 5). The engine 4 is installed on the engine mounting brackets 28 through rubber mounts 29 (FIG. 6), which serve to attenuate engine vibration transmitted to the front frame member 21.

The crankshaft 5 (see FIG. 7) of the engine 4 thus mounted on the front frame member 21 extends longitudinally of the vehicle body. A power output shaft for transmitting power to a working unit is connected by a belt-and-pulley mechanism to the crankshaft 5 and attached to the front frame member 21, and a working unit is coupled to the power output shaft, as described in detail below.

Figure 7:
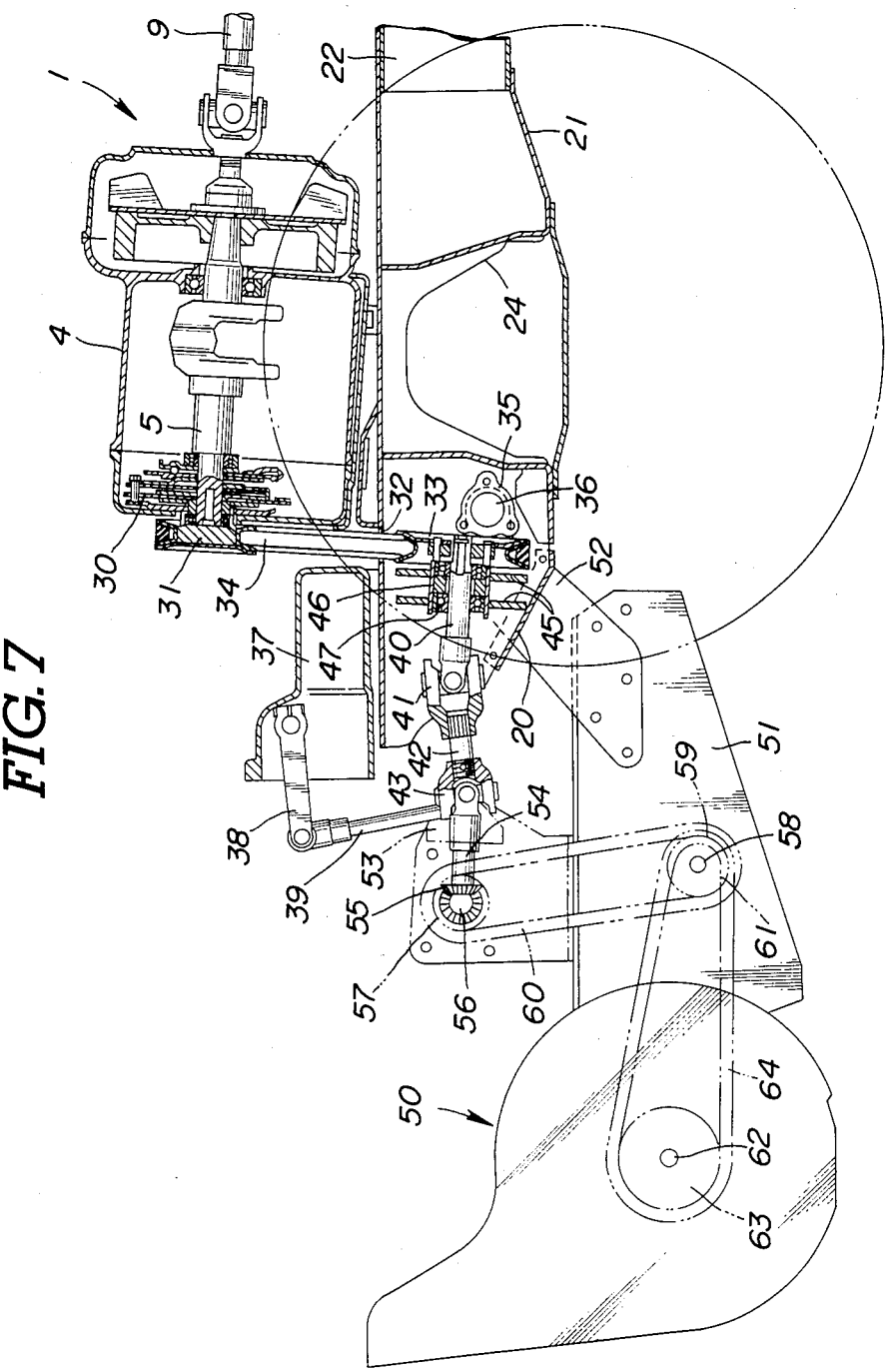
FIG. 7 is an enlarged fragmentary vertical cross-sectional view of a front end portion of the front frame member, showing a power output structure for a working unit which is illustrated as a snowplow.

As illustrated in FIG. 7, a clutch 30 and an input pulley 31 are successively mounted on the front and of the crankshaft 5. The front frame member 21 has a rectangular hole 32 defined therein directly below the input pulley 31. An output pulley 33 is angularly movably mounted by a power output shaft 40 in the front frame member 12. An endless belt 34 is trained around the input and output pulleys 31, 33 and extends through the rectangular hole 32. Brackets 35 (only one shown) are attached respectively to the inner surfaces of the side walls 21b between the recesses 24 and the output pulley 33. Stays 52 (only one shown) are vertically swingably mounted on the brackets 35 by pivot pins 36, the stays 52 being positioned outwardly of the front frame member 21. The stays 52 are fastened to a support arm 51 of a working unit 50 which is illustrated here as a snowplow.

The power output shaft 40 is supported by two brackets 45 in the form of support plates extending parallel to each other and secured to the confronting inner surfaces of the side walls 21b of the front frame member 21. The power output shaft 40 is rotatably supported by a ball bearing 47. The bearing 47 is coaxially situated in an outer bearing sleeve 46 which extends substantially centrally through the bracket plates 45 in the longitudinal direction of the front frame member 21. The power output shaft 40 is directed longitudinally of the vehicle body and has its front end positioned within the front frame member 21. The front frame member 21 with the power output shaft 40 disposed therein has an open front lower side covered with a detachable cover plate 20 attached thereto below the power output shaft 40. Therefore, the power output shaft 40 is surrounded vertically and laterally within the front end of the front frame member 21. Since the front end of the power output shaft 40 does not project out of the front end of the front frame member 21, there is no danger of foreign objects physically interfering with the power output shaft 40. The working unit 50 has an input shaft (described below) that can easily be coupled to the power output shaft 40 through an opening in the front end of the front frame member 21.

In FIG. 7, a universal joint 41 is coupled to the power output shaft 40, and a connecting shaft 42 has one end splined to the universal joint 41. The other end of the connecting shaft 42 is connected by a universal joint 43 to an input shaft 54 of the working unit 50. Therefore, power from the power output shaft 40 can smoothly be transmitted to the input shaft 54 of the working unit 50 even when the working unit 50 is vertically adjusted in position by a hydraulic cylinder 37 mounted on the upper surface of the front end of the front frame member 21.

The input shaft 54 of the working unit 50 is operatively coupled to a first chain shaft 56 through a bevel gearing 55, while the first chain shaft 56 supports a first sprocket 57 secured to one end thereof. A first chain 60 is trained around the first sprocket 57 as well as a second sprocket 59, which is fixed to one end of a second chain shaft 58 rotatably supported by the support arm 52 below the first chain shaft 56. A second chain 64 is trained around a third sprocket 61, which is fixed to the other end of the second chain shaft 58, and a fourth sprocket 63 secured to a driven shaft 62 rotatably supported in front of the second chain shaft 58. Therefore, power transmitted from the power output shaft 40 to the input shaft 54 is then transmitted through the bevel gearing 55, the first chain shaft 56, the first sprocket 57, the second chain shaft 58, the first chain 60, the second sprocket 59, the third sprocket 61, the second chain 64, and the fourth sprocket 63 to the driven shaft 62, to which an auger (not shown) is attached for corotation. The hydraulic cylinder 37 mounted on the front frame member 21 has a lever 38 with its front end operatively coupled by a rod 39 to a bracket 53 of the working unit 50, so that the working unit 50 can be vertically moved for positional adjustment when the hydraulic cylinder 37 is operated.

When the engine 4 is started and the clutch 30 is connected, rotative power generated by the engine 4 is transmitted through the clutch 30, the input pulley 31, the endless belt 34, the output pulley 33, the power output shaft 40, the universal joint 41, the connecting shaft 42, the universal joint 43, the input shaft 54 of the working unit 50, the bevel gearing 55, the first chain shaft 56, the first sprocket 57, the first chain 60, the second sprocket 59, the second chain shaft 58, the third sprocket 61, the second chain 64, the fourth sprocket 63, and the driven shaft 62 to the non-illustrated auger for clearing away snow.

The working unit 50 can be vertically adjusted in position about the pivot pins 36 by the hydraulic cylinder 37.

With the above arrangement, the stays 52 coupled to the support arm 51 are angularly movably supported directly by the pivot pins 36 to the brackets 35 positioned in the front frame member 21 in front of the front wheel differential 16. Therefore, the working unit 50 is supported very securely by the front frame member 21, relying upon its mechanical strength and rigidity, without requiring any special or additional support members.

Because the output pulley 33 and the power output shaft 40 are angularly movably supported directly in and by the front frame member 21, no special members are required to support the output pulley 33 and the power output shaft 40 for angular movement in relation to the front frame member 21. As a consequence, the front end portion of the front frame member 21, including the arrangement by which the power output shaft 40 is angularly movably supported therein, is simple in structure, small in size, and can be manufactured at a low cost.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A chassis frame in a rider-controlled working vehicle having an engine, a gear transmission, and a differential, comprising:
    a front frame member having a substantially channel-shaped cross section opening downwardly, said engine being mounted on said front frame member;
    a rear frame member having a substantially channel-shaped cross section opening upwardly, said gear transmission being connected to a rear end of the rear frame member; and
    a central frame in the form of a tubular body having a substantially rectangular cross section and positioned between said front and rear frame members, said front, rear, and central frame members having confronting ends joined in interfitting relation;
    said differential being housed in said front frame member; and
    said gear transmission being connected to said engine by a first propeller shaft, said differential being connected to said gear transmission by a second propeller shaft, and said central frame accommodating said second propeller shaft.

2. A chassis frame according to claim 1, further including: a power output shaft disposed in said front frame member and having a front end disposed within a front end of said front frame member, said power output shaft being operatively coupled to said engine; and a cover plate attached to said front frame member below said power output shaft.

3. A chassis frame according to claim 1, wherein said differential has transversely extending output shafts, said front frame member having a pair of transversely spaced side walls having downwardly opening recesses, respectively, defined therein, said output shafts of the differential extending transversely of said front frame member through said recesses, and said chassis frame further includes a cover plate detachably attached to said front frame member in covering relation to a bottom of said differential.

4. A chassis frame according to claim 1, wherein said engine is mounted on said front frame member by rubber mounts.

5. A chassis frame in a rider-controlled working vehicle having an engine, a gear transmission, and a differential, comprising:
a front frame member having a substantially channel-shaped cross section opening downwardly, said differential being housed in said front frame member in a swingably suspended manner; and
said differential having transversely extending output shafts, said front frame member having a pair of transversely spaced sidewalls having downwardly opening recesses, respectively, defined therein, said output shafts of the differential extending transversely of said front frame member through said recesses, and said chassis frame further including a cover plate detachably attached to said front frame member in covering relation to a bottom of said differential.

6. A chassis frame according to claim 5, wherein said engine is mounted on said front frame member by rubber mounts.

7. A chassis frame in a rider-controlled working vehicle having an engine, comprising:
at least a front end portion having a substantially channel-shaped cross section opening forwardly and downwardly;
a power output shaft disposed in said front end portion and having a front end disposed within a front end of said front end portion, said power output shaft being operatively coupled to said engine; and
a cover plate attached to said front end portion below said power output shaft.

8. A chassis frame according to claim 7, wherein said power output shaft is supported by a bearing on at least one bracket attached to and extending between side walls of said front end portion.

9. A chassis frame according to claim 7, further including at least one pivot shaft mounted on said front end portion for supporting a working unit for vertical angular movement.

* * * * *

UNITED STATES PATENT AND TRADEMARK OFFICE
CERTIFICATE OF CORRECTION

PATENT NO. : 4,746,145

DATED : May 24, 1988

INVENTOR(S) : Noriyasu FURUICHI et al

It is certified that error appears in the above-identified patent and that said Letters Patent is hereby corrected as shown below:

Column 1, line 7, change "ridercontrolled" to --rider-controlled--;
              line 44, change "design as" to --designs--.
    Column 2, line 21, after "which" change "s" to --is--.
    Column 3, line 31, change "outer" to --output--.
    Column 4, line 55, after "front" change "and" to --end--.
    Column 5, line 45, after "arm" change "52" to --51--.

Signed and Sealed this

Twenty-fifth Day of October, 1988

Attest:

DONALD J. QUIGG

Attesting Officer

Commissioner of Patents and Trademarks